UNITED STATES PATENT OFFICE.

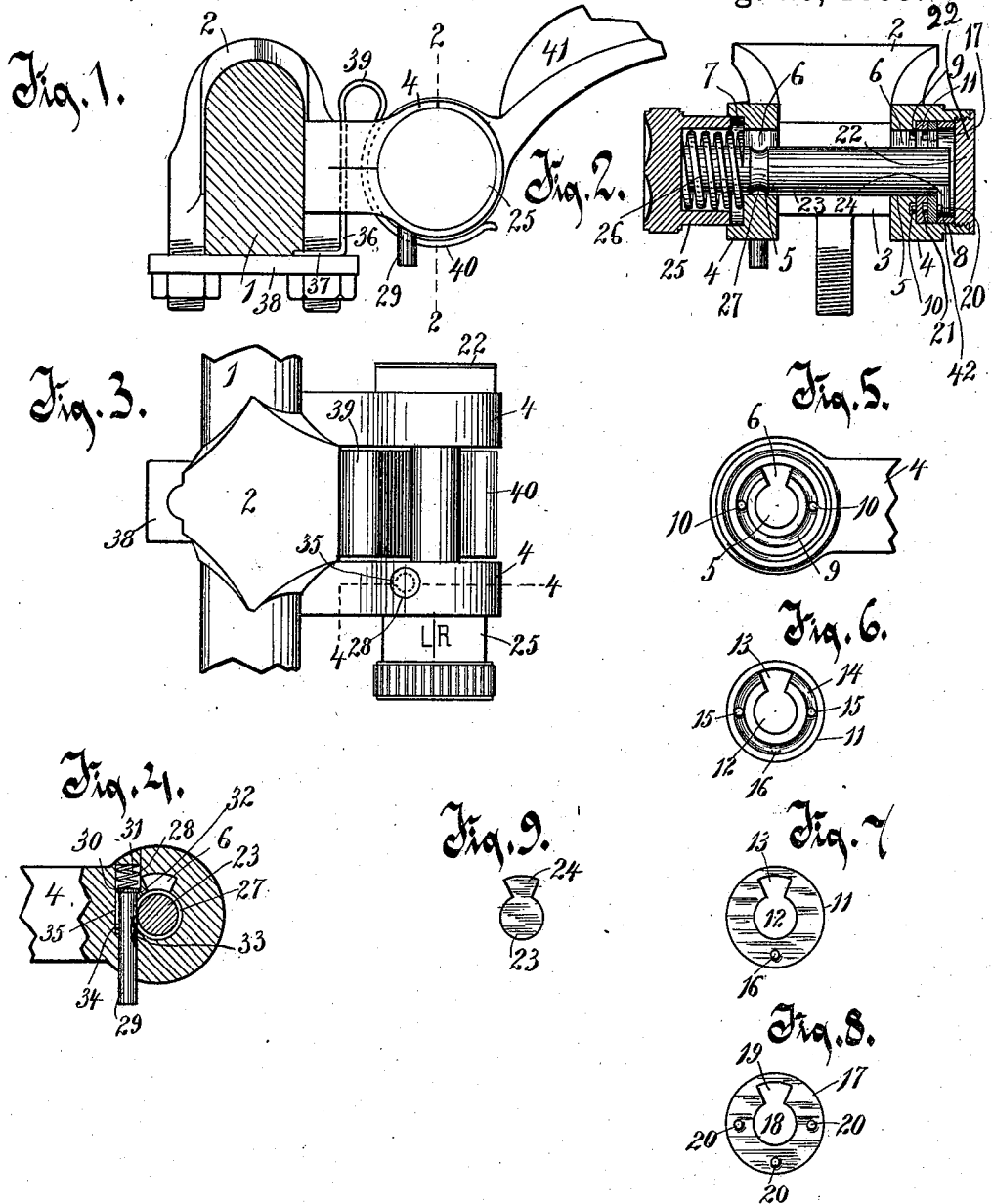

JOHN N. MOEHN, OF MILWAUKEE, WISCONSIN, ASSIGNOR OF ONE-HALF TO THOMAS PIDD, OF SAME PLACE.

THILL-COUPLING.

SPECIFICATION forming part of Letters Patent No. 504,230, dated August 29, 1893.

Application filed April 3, 1893. Serial No. 468,817. (No model.)

*To all whom it may concern:*

Be it known that I, JOHN N. MOEHN, of Milwaukee, in the county of Milwaukee and State of Wisconsin, have invented a new and useful Improvement in Thill-Couplings, of which the following is a description, reference being had to the accompanying drawings, which are a part of this specification.

My invention has relation to improvements in thill-couplings.

The primary object is to provide an anti-rattling thill-coupling, combining therewith a combination lock mechanism, whereby the thill is securely locked in place against uncoupling by persons unfamiliar with the combination, or detachment through accident, or other causes.

In the accompanying drawings, Figure 1, is a side elevation of the device. Fig. 2, is a transverse sectional view on the line 2—2 of Fig. 1. Fig. 3, is a plan view. Fig. 4, is a sectional view on the line 4—4 of Fig. 3. Fig. 5, is a fragment in elevation of one side of the device, removed from the vehicle, and showing the cap, and interior rings removed. Fig. 6, is a detail view of the outer face of the inner ring. Fig. 7, is a detail view of the inner face of said ring. Fig. 8, is a detail view of the outer face of the outer ring, and Fig. 9, is an end view of the bolt.

Like numerals of reference denote like parts throughout the several views.

Referring to the drawings, the numeral 1 indicates the fore-axle of a vehicle, and 2 the axle-clip secured thereto in the usual manner. The front leg of the clip is formed with a transverse arm 3 from the opposite ends of which project forwardly arms 4, 4, both of said arms being provided with central apertures, 5, 5, which communicate with radial openings 6, 6, and the arm upon the left of Fig. 2 upon its outer face provided with a countersunk recess 7. The arm on the right of Fig. 2 is also provided with a countersunk recess 8, somewhat deeper than recess 7. The bottom of this recess is formed with an annular groove 9, the continuity of which is broken only by the radial opening 6.

Projecting outwardly from diametrically opposite points of the annular groove, are pins 10, 10.

Adapted to rest upon the bottom of the countersunk recess 8 is an annulus or ring 11, provided with a central aperture 12 registering with the aperture 5 and with a radial aperture 13 adapted to be brought into register with the contiguous radial aperture 6. This annulus or ring is provided upon its outer face with an annular groove 14, similar in all respects to the groove in the bottom of the countersunk recess. Projecting outwardly from this annular groove, at diametrically opposite points, are pins 15, 15. The reverse or inner side of this ring is a plain surface, and is provided with an inwardly extending pin 16, adapted to rest in the annular groove of the bottom of the countersunk recess. The opposite sides of the annulus or ring just described are clearly shown in Figs. 6 and 7.

Fig. 8 represents an annulus or ring 17 which is disposed within the countersunk recess, and lies against the annulus or ring 11, being also provided with a central aperture 18 and a radial opening 19. The outer face of this ring is not provided with an annular groove, as is the case with ring 11, but is provided with a series of outwardly projecting pins 20, preferably three. The inner face is not shown, inasmuch as it is an exact duplicate of the inner face of ring 11, being provided with an inwardly-extending pin 21 which seats itself in the annular groove 14 of ring 11. The outer open end of countersunk recess 8 is closed by means of a screw-threaded cap 22.

The numeral 23 indicates a locking key, which is provided upon its end with a lug 24, conforming in shape to the contour of the radial openings. This key is adapted to be passed through the registering apertures and their radial extensions of the forwardly extending arms 4, 4, and also through the central openings and the radiating extensions of the rings 11 and 17, when all of the several radial openings are brought into alignment. The outer end of the key is formed into a cylindrical boxing or casing 25. A coiled spring 26 encircles that portion of the key which is surrounded by the casing, one end of the spring bearing against the inner side of the head of the casing, and the opposite end bearing against the bottom of the countersunk recess 7. The exterior of the head of the cylindrical casing is milled, as clearly shown in Fig. 3, whereby a convenient finger grasp for turning is afforded. The key 23 is also provided with an annular groove 27, and the arm 4 on the left of Fig. 2 is provided with an elongated recess 28, extending up from the under side of the arm. Adapted to be passed into this recess is a bolt or pin 29, having an upper headed portion 30, between which and the top of the recess is disposed a coiled spring 31. This spring keeps the bolt normally in the position illustrated in Fig. 4. In that position the pin or bolt is in engagement with the annular groove 27, so that the key is prevented from being moved in a longitudinal line. In order to retain the bolt in its position within the recess, the headed portion is seated upon a shoulder 32. The bolt is furthermore provided with a depression or recess 33, and with a laterally-extending pin 34, which is passed into a slit or recess 35, and thus held secure against turning. When it is desired to work the key longitudinally the finger is pressed upon the lower end of the pin or bolt 29 and the latter raised against the pressure of spring 31 until the recess 33 is made to register with the annular groove 27. As long as the finger pressure is continued, it is obvious that the key may be freely worked longitudinally. This locking mechanism is employed by me as an additional safeguard against the uncoupling of the thill, either by accident or design, by reason of any longitudinal movement of the key. It will be understood, however, that it is not essential to the successful working of my device, and can be entirely omitted, if desired, without departing from the broad spirit and scope of my invention. A spring cushion of flat metal is passed between the forwardly extending arms 4, 4, said cushion having an approximately straight portion 36, with the lower end bent back horizontally as indicated at 37, and resting on top of the plate 38, beneath the fore-axle. This horizontal portion is also provided with an aperture, not shown, through which the forward leg of the clip passes. The straight portion of the spring merges at its upper end into a loop 39, said loop being of such size and contour as to press against the upper portion of the thill-eye and exert a downward pressure thereon. From the upper point of contact the spring is continued down in a reverse curve 40, conforming exactly to the curve of the thill-eye, and bearing against said thill-eye at the back of the iron, the curve continuing forward beneath said iron, and to the front thereof. It will be seen that the straight portion of the spring, and the downward curve thereof form a loop, the upper portion of which at the bend, being widened so as to bring the point where the inward curve begins to bear against the upper part of the thill-eye. A spring cushion thus constructed is not only an effective anti-rattler, being particularly efficient in preventing rattling when stones or other obstructions in the road-bed are encountered, but, at the same time, also relieves the animal of considerable of the weight of the vehicle.

In order to retain the rings 11 and 17 properly in place, I provide a circular band 42 which bears against the outer face of ring 17, and when the cap 22 is screwed into place, the inner side of said cap bears against the edge of the band, and thus firmly holds the rings to place. When the parts are in the position shown in Fig. 2, the key is firmly locked in place, inasmuch as it has been passed through the several registering central openings and radiating openings of the arms 4 and the rings 11 and 17, respectively, and the lug 24 of the key is bearing against the outer face of ring 17, away from, or out of line with, the radial opening 19 thereof, and lying between two of the pins 20, 20. We will suppose the position of this lug to be between the pins on the left of Fig. 8, and the pin at the lower end of said figure.

In Fig. 3, is shown, upon the cylindrical boxing or casing 25, an index line. Upon the arm 4 contiguous there is also an index line, with which the line on the cylindrical boxing is adapted to be brought into register. The lug 24 being between the two pins 20, 20 previously referred to, the first step is to turn the key until the lug comes in contact with either one of said pins. When this is done, the ring 17 is carried around with the key and the rotation of the two together will continue until the inwardly extending pin 21 of ring 17 contacts with either one or the other of the pins 15, 15 of ring 11. This contacture, with the continued turning of the key also causes ring 11 to be rotated with ring 17, until the inwardly-extending pin of ring 11 strikes either of the pins 10, 10, arranged in the countersunk recess 8. As this recess is located in the rigid arm 4, of course all further rotation of the rings is arrested. We will assume that at the outset the lug 24 was in contact with the pin 20 nearest the radial slot 19 of ring 17. Under such an arrangement of the parts, after being operated in the manner just described, the next step would be to press inward upon the key, and raise the lug over said pin 20, and continue the turning of key 23, which turning is now entirely independent of the several rings, until the lug reaches the radial opening 19, at which point the action of spring 26 will bring the lug into engagement with the radial opening. It is obvious that all further turning of the key in the same direction is now prevented, from the fact that the positions of the several rings are such that the inwardly extending pin 16 is in engagement with one of the pins 10. It consequently becomes necessary to turn in the reverse direction until the radial opening 13 of disk 11 is reached, when the lug 24 will immediately drop into this opening. The position of lug 24 is now between the pins 10, 10, in the upper half circle of the annular groove 9, and consequently all that remains to be done is simply to turn the key, and with it the ring 11, until the radial opening 6 is reached. The lug 24 will then immediately fall into this radial opening, and the key may be pulled out without difficulty. It will be noticed that when the key is thus pulled out, the index line on the cylindrical boxing 25 is in register with the line on the forwardly extending arm 4. The radial opening 13 of ring 11 has also been left in register with the radial opening 6 of said forwardly-extending arm. If now, it is desired to couple the thill of the vehicle, all that is necessary to be done is to pass the thill between forwardly-extending arms 4. The key is then passed through the aperture of one of the arms 4, then through the aperture of the thill, and thence into the aperture of the opposite arm 4. In making this last insertion, care should be taken to see that the index lines of the cylindrical casing, and the forwardly extending arm, register, for in that position, the key and its end lug are readily passed through the opening and radial slot of the arm 4, and through the opening and radial slot of the ring 11. The key is then turned, and together with it the ring 11, until a point is reached where the radial slot of said ring registers with the radial slot 19 of ring 17. At this point, the key is pressed inward until the lug 24 is brought laterally beyond the radial opening 19, and is then turned until it passes one of the pins 20, after which pressure thereon is released which brings it back to a position corresponding to the position it occupied before uncoupling, and the thill is thus locked securely in place.

The above description relates to the operation when the bolt or pin 29 is not employed. When this is used, however, it becomes necessary to exert an upward pressure with the finger of one hand upon this pin so as to bring its recess 33 into alignment with the annular groove 26 of the key, so as to allow of a longitudinal movement of this key. This pressure is continued until unlocking is accomplished.

Having thus described my invention, what I claim, and desire to secure by Letters Patent, is—

1. In a thill coupling, the combination of an axle clip provided with forwardly extending arms, said arms provided with apertures having openings radiating therefrom, one of said arms provided with a countersunk recess, the bottom of which is formed with an annular groove having pins projecting outwardly from the same at diametrically opposite points, a ring provided with a central aperture and with an opening radiating from the aperture, said ring provided upon its outer face with an annular groove and at diametrically opposite points in said groove with projecting pins, and upon its inner face with a pin extending into the groove of the bottom of the countersunk recess, in the lower half circle of said recess, a ring bearing against the first named ring, provided upon its inner face with a projecting pin entering the groove of the first ring, and upon its outer face with a series of outwardly extending pins, and a spring-actuated key provided upon its end with a lug said key and its lug adapted to be passed through the several openings and radial openings in the arms and rings, respectively, substantially as set forth.

2. In a thill coupling, the combination of a clip provided with forwardly-extending apertured arms, a key passing through the arms, locking mechanism in one of the arms for engaging the end of the key, the latter also provided with an annular groove, a pin or bolt entering a recess in the other arm, said pin or bolt provided with a depression or recess, means for retaining the pin or bolt within the recess, and a spring for normally holding the depressed or recessed portion of the pin or bolt out of register with the annular groove of the key, substantially as set forth.

3. In a thill-coupling, the combination, of an axle clip, provided with forwardly-extending arms, said arms provided with apertures having openings radiating from the same, and one of the arms further provided with a countersunk recess, having pins projecting out from the bottom of the same at opposite points, a ring provided with a central aperture and with an opening radiating from said aperture, said ring provided upon its outer face with projecting pins and upon its inner face with a pin constructed to be brought into contact with the pins of the countersunk recess, and a spring-actuated key provided upon its end with a lug, said key and its lug adapted to be passed through several openings and radial openings in the arms and rings, respectively, substantially as set forth.

4. In a thill coupling, the combination, of an axle-clip provided with forward-extending arms, said arms provided with apertures having openings radiating therefrom, and one of said arms provided with a counter-sunk recess having pins projecting from the bottom of the same at opposite points, a ring provided with a central aperture and with an opening radiating from the aperture, said ring having pins projecting from the outer face thereof at opposite points, and also provided upon its opposite face with a projecting pin, a ring bearing against the first named ring, provided upon its inner face with a projecting pin adapted to be brought into contact with the pins of said first named ring and upon its outer face with a series of outward-extending pins, and a spring-actuated key provided upon its end with a lug, said key and its lug adapted to be passed through the several openings and radial openings in the arms and rings respectively, substantially as set forth.

In testimony whereof I affix my signature in presence of two witnesses.

JOHN N. MOEHN.

Witnesses:
ARTHUR L. MORSELL,
ANNA V. FAUST.